Figures 1, 2:
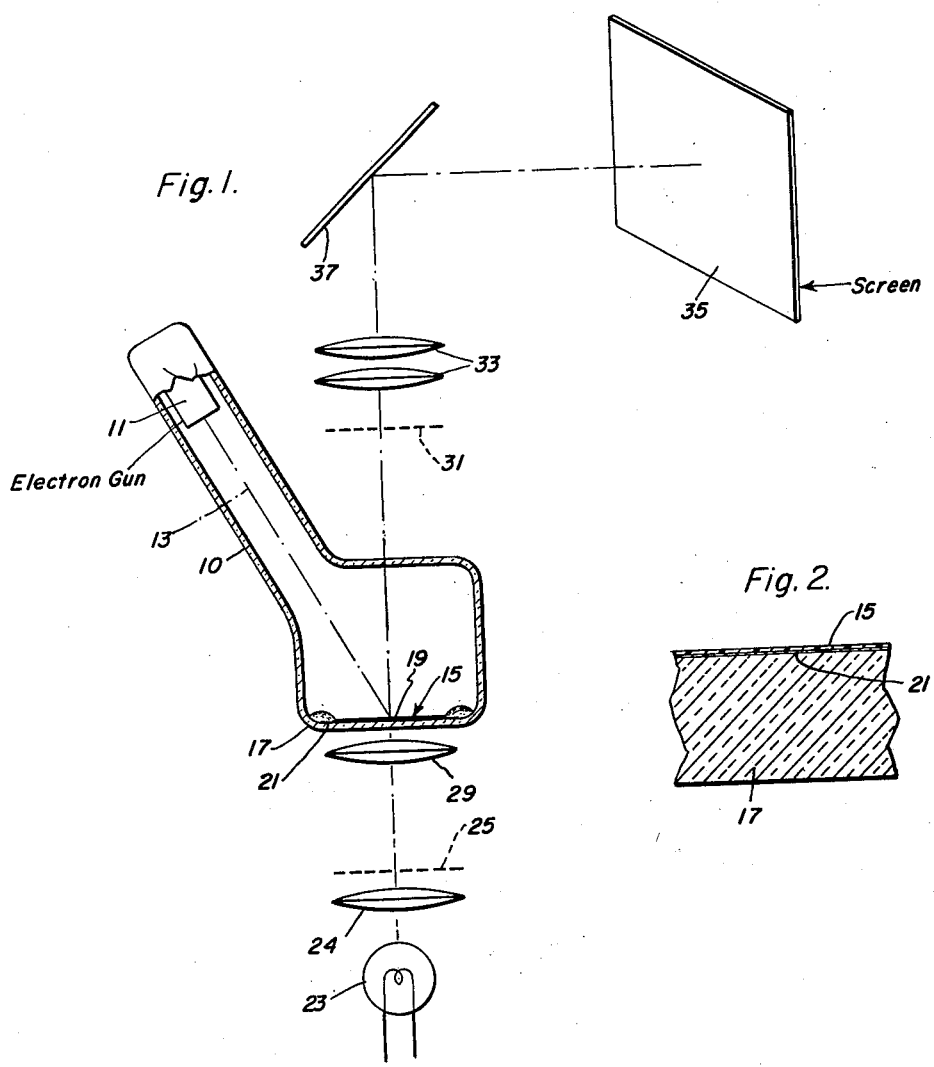

March 17, 1964  J. F. KLEBE  3,125,636
COMPOSITION FOR USE AS DEFORMABLE MEDIUM
AND APPARATUS USING THE SAME
Filed June 5, 1962

Inventor:
Johann F. Klebe,
by Joseph T. Cohen
His Attorney.

United States Patent Office 3,125,636
Patented Mar. 17, 1964

3,125,636
COMPOSITION FOR USE AS DEFORMABLE MEDIUM AND APPARATUS USING THE SAME
Johann F. Klebe, Schenectady, N.Y., assignor to General Electric Company, a corporation of New York
Filed June 5, 1962, Ser. No. 200,143
13 Claims. (Cl. 178—7.5)

This invention is concerned with compositions of the matter having low volatilities and enhanced resistance to radiation. More particularly, the invention relates to a composition of matter having the general formula

I         Z—CH$_2$CH$_2$—O—CH$_2$—Z′ where Z is a member selected from the class consisting of biphenyl and terphenyl radicals and Z′ is a biphenyl radical wherein one phenyl radical may be ortho, para or meta to the other phenyl radical, the aforesaid terphenyl radical being substituted in the 4′ position (denoted by the asterisk) in accordance with the designation represented by the following terphenyl radical formula:

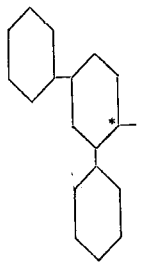

The aforesaid compositions of matter, because of their low volatility, radiation resistance and high temperature stability are useful as lubricating, insulating and protective fluids for electric equipment which will be maintained in an area subject to ionizing radiation such as in an atomic plant. These materials are especially useful as fluids for use as the recording medium by means of electrons as more particularly disclosed and claimed in U.S. Patent 2,943,147, issued June 28, 1960, and assigned to the same assignee as the present invention.

The compositions of the present invention may be prepared by reacting a Grignard reagent of the formula Z—Mg—Br with ethylene oxide under suitable conditions so that one obtains the polyphenyl substituted ethanol of the formula

Z—CH$_2$CH$_2$OH

Thereafter the polyphenylethanol compound is reacted with n-butyl lithium, and this reaction product is then reacted, advantageously at room temperature, with a bromoarylalkyl compound of the formula Br—CH$_2$—Z′ to obtain the desired compositions having the structural Formula I, where Z and Z′ have the meanings given above.

In order that those skilled in the art may better understand how the present invention may be practiced, the following examples are given by way of illustration and not by way of limitation. All parts are by weight.

EXAMPLE 1

This example illustrates a preparation of 4′-m-terphenylylethyl-p-biphenylylmethyl ether having the formula

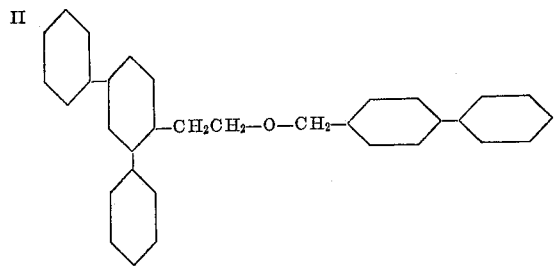

A mixture of 300 grams of 4′-bromoterphenyl and 109 grams of ethyl bromide dissolved at 1.5 liters tetrahydrofuran was added with stirring over a period of 3 hours to 50 grams of magnesium, and the mixture was then refluxed for an additional 15 hours. To the Grignard solution was added over a period of 4 hours, 300 grams of ethylene oxide gas at room temperature. The reaction complex which formed was stirred for an additional 15 hours and then decomposed with an excess of aqueous ammonium chloride solution. The product was extracted with diethyl ether and distilled to give a fluid boiling at 180–200° C./0.1 mm., and having a melting point at 50–55° C. This composition was identified as 4′-(2-hydroxyethyl)-m-terphenyl. To a solution of 27 grams of the aforesaid 4′-(2-hydroxyethyl)-m-terphenyl in 50 cc. dry tetrahydrofuran, was added under an atmosphere of dry nitrogen, 32 grams of a 20 percent weight solution of n-butyl lithium in heptane. The solvents were removed in vacuum and the residue was redissolved in 50 cc. of dry dimethylformamide. To this solution was added 25 grams of p-biphenylylmethylbromide at room temperature (23° C.). The temperature of the stirred mixture rose to 50° C. After 15 hours stirring, the mixture was poured into 200 cc. water, extracted with diethyl ether, washed and dried and thereafter the composition was distilled after removal of the solvent. The product thus obtained was recrystallized from a 2 to 1 weight ratio of a methanol-benzene mixture to give a product of Formula II which melted at 110–111° C. and boiled at 260–270° C. at /0.01 mm. Analysis showed the composition to contain 90.1 percent carbon and 6.2 percent hydrogen as contrasted to theoretical values of 90.0 percent carbon and 6.4 percent hydrogen.

EXAMPLE 2

In this example, 4′-m-terphenylylethyl-o-biphenylylmethyl ether having the formula

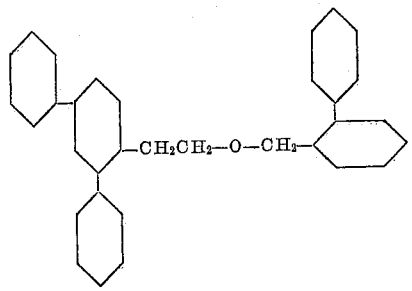

was prepared similarly as was done in Example 1 with the exception that o-biphenylylmethylbromide was used in place of the p-biphenylylmethylbromide employed in Example 1. There was thus obtained the aforesaid compound of Formula III, which was a waxy solid at room temperature, and boiling at 258–265° C./0.01 mm. Analysis of this compound showed it to contain 89.5 percent carbon and 6.47 percent hydrogen, as contrasted to the theoretical value of 90.0 percent carbon and 6.4 percent hydrogen.

EXAMPLE 3

This example illustrates the preparation of p-biphenylylethyl-o-biphenylylmethyl ether having the formula IV 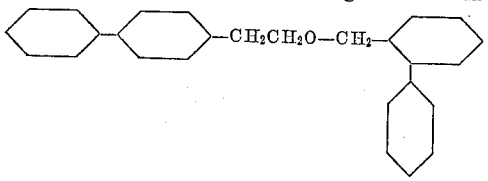

For this purpose a mixture of o- and p-biphenylylethanol-1 was preparaed by a method described in an article by J. Cologne et al., Bull. Soc. Chim. France, page 825 (1948), from biphenyl, ethylene oxide and aluminum chloride in chlorobenzene. The para isomer was separated by fractional distillation. To the stirred, ice-cooled solution of 200 grams of p-biphenylylethanol and 600 cc. of dry tetrahydrofuran was added dropwise 540 cc. of 19.8 percent n-butyllithium solution in heptane. The solvents were removed and the pale yellow, syrupy residue was redissolved in 600 cc. of dry dimethyl formamide. About 250 grams o-phenylbenzyl bromide was added to the stirred solution whereupon the temperature of the mixture rose spontaneously to 70° C. The mixture was stirred for 12 hours at room temperature and then the desired product was isolated in the same manner as was done in the previous examples. Upon distillation of the reaction product under vacuum, there was obtained 230 grams of a fluid having a boiling point of 235–250° C./0.01 mm. Analysis of this compound showed it to have the above-identified Formula IV, as was evidenced by the fact that it contained 88.33 percent carbon and 6.69 percent hydrogen as contrasted to the theoretical values of 89.0 percent carbon and 6.6 percent hydrogen.

EXAMPLE 4

In this example, the compound having the formula

V 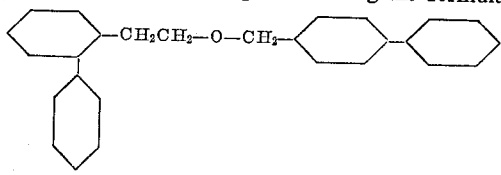

was prepared similarly as was done in Example 3 with the exception that p-phenylbenzyl bromide was used in place of o-phenylbenzyl bromide and o-biphenylylethanol was used in place of the p-biphenylylethanol in Example 3. After carrying out the reaction similarly as in Example 3, there was obtained a product having a melting point of 45–47° C. and a boiling point of 230–240° C./0.01 mm. Analysis of this compound showed it to contain 88.68 percent carbon and 6.67 percent hydrogen as contrasted to the theoretical values of 89.0 percent carbon and 6.6 percent hydrogen.

EXAMPLE 5

In this example, a composition having the formula

VI 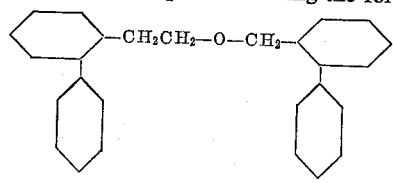

was prepared similarly as was done in Example 3 with the exception that o-biphenylylethanol having the formula

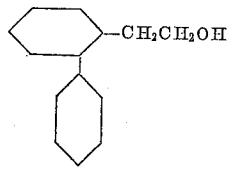

was used in place of the p-biphenylylethanol in Example 3, all of the other ingredients and conditions being the same. There was thus obtained a composition having the Formula VI which had a melting point of 55–60° C., and a boiling point of 230–240° C./0.01 mm. Analysis of this compound showed it to contain 88.57 percent carbon and 6.9 percent hydrogen as contrasted to the theoretical value of 89.0 percent carbon and 6.6 percent hydrogen.

EXAMPLE 6

In this example a compound having the formula

VII 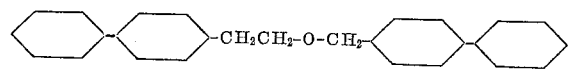

was prepared similarly as in Example 3, with the exception that p-biphenylylmethylbromide was used in place of the o-biphenylylmethylbromide. Otherwise the conditions and other ingredients were essentially the same. There was thus obtained the above-identified composition having Formula VII melting at 46–48° C. and boiling at 230–235° C./0.01 mm. Analysis of this compound showed it to contain 87.49 percent carbon and 6.63 percent hydrogen as contrasted to the theoretical value of 89.0 percent carbon and 6.6 percent hydrogen.

The densities and refractive indices of the compositions prepared in accordance with Examples 3 to 5 were determined and found to be as follows:

*Table 1*

| Composition of— | Density | Refractive Index $\eta_D^{20}$ |
|---|---|---|
| Example 3 | $d_{25}=1.10$ | 1.6274 |
| Example 4 | $d_{20}=1.10$ | 1.6284 |
| Example 5 | $d_{25}=1.10$ | 1.6203 |

EXAMPLE 7

In this example, a mixture of isomers was prepared from the compositions of Examples 3, 4, 5 and 6, so that the composition had the general formula

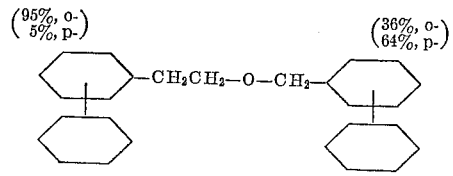

whereby the biphenylylethyl portion of the ether was 95% of the ortho derivative and 5% of the para derivative, while the biphenylylmethyl portion of the ether was 36% of the ortho isomer and 64% of the para isomer. This mixture of ingredients was a fluid at room temperature (27° C.) and had a boiling point of 230°–240° C. at 0.01 mm. It had a density $d_{25}=1.10$, a refractive index $\eta_D^{20}$ 1.6263, and a viscosity of 1470 centistokes at 25° C.

The above class of compositions had very low vapor pressures and evidenced relatively small viscosity changes when subjected to irradiation with high energy electrons in contrast to the higher vapor pressures (well above the desired $10^{-5}$ mm. at room temperature) and greater changes in viscosity found in compounds in which Z and Z' in Formula I were phenyl radicals. Thus, dibenzyl ether was found to be unstable in the presence of high energy electrons, and increased rapidly in viscosity indicating an increase in molecular weight.

In order to determine (by means of an accelerated test) the radiation resistance of the aforesaid compositions in an electron beam which would be the conditions under which these fluids would be expected to operate in the above-described projection system, the fluids of Examples 1, 3, 4, 5 and 8 were subjected to electron irradiation with a 1500 kv. resonant transformer at a current input of 200–500 microamperes at a dose of $20-50 \times 10^6$ roentgens/minute. The following Table II shows the total number of molecules of gas per 100 electron volts absorbed (identified as "G gas"), as well as the change in viscosity (in centistokes) prior to irradiation (identified as "$\eta_0$, cs.") and after irradiation (identified as "$\eta$, cs.") at the temperature at which irradiation was measured.

Table II

| Composition of— | G gas | $\eta_0$, cs. | | $\eta$, cs. | |
|---|---|---|---|---|---|
| | | Temp., °C. | Visc. | Temp., °C. | Visc. |
| Example 1 | 0.073 | 112 | 24 | 112 | 27 |
| Example 3 | 0.147 | 25 | 2,400 | 25 | 3,500 |
| Example 4 | 0.150 | 25 | 1,200 | 25 | 1,750 |
| Example 5 | 0.115 | 25 | 4,200 | 25 | 5,000 |
| Example 8 | 0.100 | 25 | 3,330 | 25 | 5,000 |

If, instead of the aforesaid ethers tested being either biphenylyl derivatives or terphenylyl derivatives, they had been only a benzene substitution for these polyaryl radicals (such as dibenzyl ether), it would be found that from 10 to 100 times more gas would have been released per 100 electron volts absorbed, and that there would have been at least a ten-fold increase in viscosity after irradiation under the conditions recited above.

To evaluate further the above compositions, a 50 weight percent mixture of each of the compositions of Formulas IV and VI were tested in the apparatus described in U.S. Patent 2,943,147, issued June 28, 1960. This patent (which by reference is made part of the disclosures of the instant application) discloses a projection system employing a deformable medium having a high resistivity which is responsive to an electron beam which is velocity modulated. In general, this apparatus, which is illustrated in FIG. 1 of the attached drawing, comprises an evacuated glass envelope containing an electron gun 11 for producing an electron beam 13 and deflecting it in a rectangular raster over the surface of a transparent deformable medium 15 that is within a portion 17 of the transparent container. An enlarged view of this portion of the assembly is shown in FIG. 2. The beam is preferably velocity modulated by a television signal that is applied to the deflection means (not shown) in the electron gun. The deformable medium has a center portion 19 of decreased thickness, coincident with the raster area of the beam, which is produced by electrons from the beam that are attracted to a conducting coating 21 on the inner surface of the container. These electrons also produce deformations in the surface of the deformable medium, the amplitudes of which are a function of the number of electrons deposited by the beam at the various points on the surface of the medium. Consequently, the amplitudes of these deformations are a function of the television signal modulating electron beam 13.

These deformations are utilized to diffract light from a light source 23 in an optical system which is illustrated as including a lens 24 that images light source 23 on the surface of medium 15 through a bar and slit system 25. Another lens 29 images the slits of system 25 on the bars of another bar and a slit system 31 in the absence of deformations in the surface of the medium. However, any deformations phase diffract the light so that it passes through the slits in the system with an intensity that corresponds to the amplitudes of the deformations and thus the amplitudes of the applied television signal. The light passing through system 29 is imaged by a projection lens 33 on a screen 35 after reflection from a mirror 37.

If a conventional deformable medium is utilized in the illustrated system, the average charge density produces a force on the medium that overcomes the surface tension from the excess medium outside the raster area and decreases the portion 19 of medium 15 to zero thickness. Then, of course, no deformations can be formed and the system becomes inoperative until the medium is replaced.

In this U.S. Patent 2,943,147, it is stated that if the medium has the property of decreasing in resistivity with decreasing thickness, portion 19 does not decrease to zero thickness under the pressure of the charges but rather maintains a thickness the value of which is a function of the magnitude of charge density on the surface of the medium. With a decrease in resistivity, the time constant is decreased for the passage of leakage current from the surface of the medium to the conducting coating 21 beneath it, resulting in increase in leakage current, which decreases the charge density on the surface of the medium thereby relieving the pressure to some degree. Eventually, an equilibrium condition is attained in which the pressure from the charges on the surface of the medium equals the pressure from the surface tension on the excess medium the raster. Then the thickness at this equilibrium condition is maintained. The charge density on the surface of the medium never decreases to zero due to the leakage because it is continually replaced by the electrons from the beam.

The deformable compositions described in the aforesaid patent U.S. 2,943,147 as suitable for the medium are required to be transparent, be capable of withstanding electron bombardment without significant decomposition, have a viscosity at the operating temperature (between about 25° C. and 100° C.) of approximately 100 to 50,000 centistokes, and the deformable composition must not decompose the conducting coating. The medium must also have a resistivity that varies within the range of approximately $10^{14}$ to $10^{11}$ ohms-cm., with the average resistivity at the stable thickness being approximately $10^{11}$ ohms-cm.

Employing a 50 weight percent mixture of the compositions of Formulas IV and VI (this mixture being a fluid at room temperature, having a boiling point of 225–235° C. at 0.01 mm., a density of $d_{20}=1.09$, a refractive index $\eta_D^{20}$ 1.6250 and a viscosity of 3300 centistokes at 25° C.), the mixture was incorporated in the above-described apparatus as the deformable medium recited therein. It was found that sharp, viewable images of good light intensity were obtained. To further establish the usefulness of compositions of this type, the aforesaid mixture of ingredients was then subjected to an electron-raster test using 10 kv. and 2 to 3 microamperes. This test involved subjecting the deformable fluid to constant electron irradiation for a time until first evidence of gelation (called "incipient gel formation") was noted. This is an accelerated, severe test, because in the normal use of the aforesaid apparatus, the deformable medium will be constantly replenished and removed from the zone of irradiation. It was found that the aforesaid composition when subjected to this severe test did not show any incipient gel formation until after 90 minutes, indicating its eminent stability under irradiation conditions. This was confirmed by testing this mixture of ingredients under an electron beam similarly as was done with the compositions of Examples 1, 3, 4, 5, and 8 (see Table II); it was found that the G gas was 0.10, the viscosity at 25° C. was 3330 centistokes and after $4 \times 10^8$ roentgens, the viscosity had risen only to 5,000 centistokes.

What I claim as new and desire to secure by Letters Patent of the United States is:

1. A projection system comprising a container having a conducting interior, a deformable medium in said container comprising a composition having the formula $$Z-CH_2CH_2-O-CH_2Z$$

where Z is a member selected from the class consisting of biphenylyl and terphenylyl radicals and Z' is a biphenylyl radical, the aforesaid terphenylyl radical being substituted in the 4' position, an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

2. A projection system comprising a container having a conducting interior, a deformable medium in said container comprising a composition having the formula

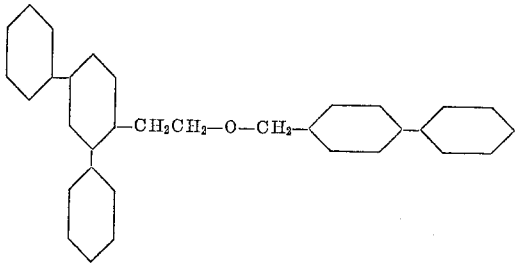

an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

3. A projection system comprising a container having a conducting interior, a deformable medium in said container comprising a composition having the formula

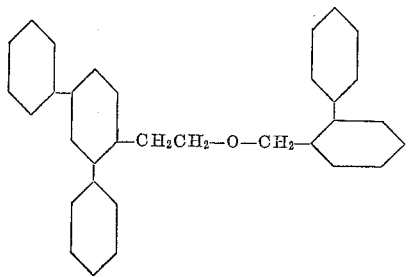

an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

4. A projection system comprising a container having a conducting interior, a deformable medium in said container comprising a composition having the formula

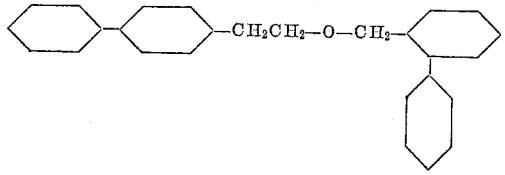

an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of the medium.

5. A projection system comprising a container having a conducting interior, a deformable medium in said container comprising a composition having the formula

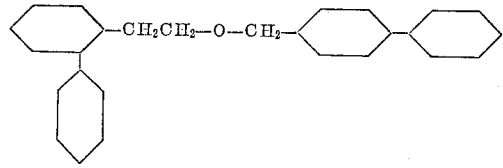

an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

6. A projection system comprising a container having a conducting interior, a deformable medium in said container comprising a composition having the formula

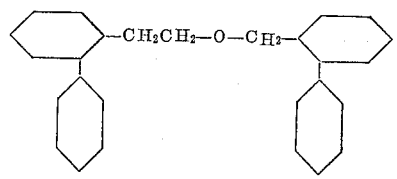

an electron beam means for producing an electrical charge on the surface of said deformable medium as a function of an applied electrical signal and cooperating with said conducting interior to subject the medium to a deforming force to produce deformations in the surface of said medium, and a light and optical system for projecting light as a function of the deformations in the surface of said medium.

7. A composition of matter having the general formula $$Z\text{—}CH_2CH_2\text{—}O\text{—}CH_2\text{—}Z'$$

where Z is a member selected from the class consisting of biphenyl and terphenyl radicals and Z' is a biphenyl radical, the aforesaid terphenyl radical being substituted in the 4' position denoted by the asterisk in accordance with the designation represented by the following terphenyl radical formula:

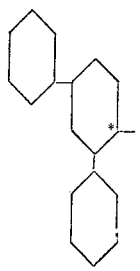

8. A composition of matter having the formula

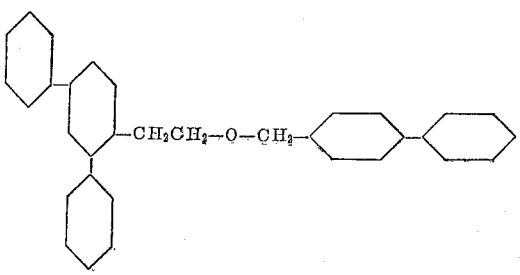

9. A composition of matter having the formula
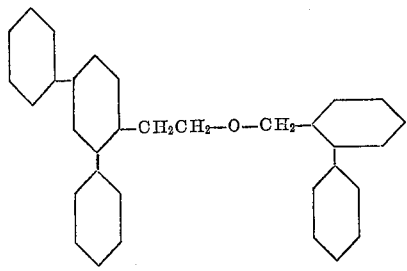
10. A composition of matter having the formula
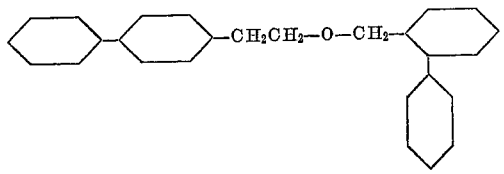
11. A composition of matter having the formula
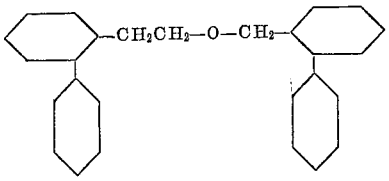
12. A composition of matter having the formula
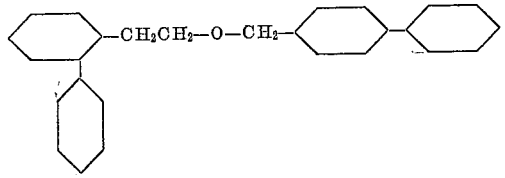
13. A composition of matter having the formula
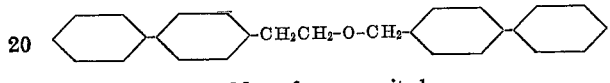
No references cited.